US012115892B2

(12) United States Patent
Lee et al.

(10) Patent No.: US 12,115,892 B2
(45) Date of Patent: Oct. 15, 2024

(54) APPARATUS FOR ADJUSTING POSITION OF ARMREST HAVING CONTROL PANEL FOR VEHICLE

(71) Applicants: Hyundai Motor Company, Seoul (KR); Kia Corporation, Seoul (KR); Hyundai Transys Inc., Chungcheongnam-do (KR)

(72) Inventors: Ki Ryung Lee, Gyeonggi-do (KR); Seung Young Lee, Seoul (KR); Sang Ho Kim, Incheon (KR); Eom Seok Yoo, Gyeonggi-do (KR); Jae Sung Lee, Gyeonggi-do (KR); Yong Seong Jang, Gyeonggi-do (KR)

(73) Assignees: Hyundai Motor Company, Seoul (KR); Kia Corporation, Seoul (KR); Hyundai Transys Inc., Chungcheongnam-do (KR)

( * ) Notice: Subject to any disclaimer, the term of this patent is extended or adjusted under 35 U.S.C. 154(b) by 72 days.

(21) Appl. No.: 17/987,546

(22) Filed: Nov. 15, 2022

(65) Prior Publication Data
US 2023/0158932 A1   May 25, 2023

(30) Foreign Application Priority Data
Nov. 22, 2021   (KR) ........................ 10-2021-0161475

(51) Int. Cl.
*B60N 2/75* (2018.01)
*B60N 2/02* (2006.01)

(52) U.S. Cl.
CPC ........... *B60N 2/77* (2018.02); *B60N 2/02246* (2023.08); *B60N 2/767* (2018.02); *B60N 2/773* (2018.02); *B60N 2/797* (2018.02)

(58) Field of Classification Search
CPC .......... B60N 2/77; B60N 2/797; B60N 2/767; B60N 2/773; B60N 2/02246
See application file for complete search history.

(56) References Cited

U.S. PATENT DOCUMENTS

| 7,014,255 | B2 * | 3/2006 | Amamiya | B60N 2/77 296/190.08 |
| 7,458,439 | B2 * | 12/2008 | Catton | B60N 2/767 248/125.8 |
| 8,388,262 | B2 * | 3/2013 | Klein | B60N 2/797 404/83 |
| 8,483,914 | B2 * | 7/2013 | Copeland | B60N 2/02246 701/50 |
| 10,005,377 | B2 * | 6/2018 | Klieber | B60N 2/773 |

(Continued)

FOREIGN PATENT DOCUMENTS

KR   102139523 B1   7/2020

*Primary Examiner* — Philip F Gabler
(74) *Attorney, Agent, or Firm* — Fox Rothschild LLP

(57) ABSTRACT

Provided is an apparatus for adjusting a position of an armrest having a control panel for a vehicle, the apparatus in which an armrest assembly having a control panel is mounted on a side member of a seat cushion in a manner that is enabled to ascend and descend and in which the control panel is mounted on an armrest assembly in such a manner that a position in the backward-forward direction and a slope of the control panel are adjustable. With the apparatus, an armrest, a controller, and the like can be easily adjusted to desired positions and heights thereof according to an occupant's physical condition.

14 Claims, 7 Drawing Sheets

(56) References Cited

U.S. PATENT DOCUMENTS

| | | | |
|---|---|---|---|
| 10,941,540 B2* | 3/2021 | Wallgren | G05G 1/62 |
| 11,285,850 B2* | 3/2022 | Gayon | B60N 2/797 |
| 11,458,872 B2* | 10/2022 | McConoughey | B60N 2/77 |
| 2018/0304789 A1* | 10/2018 | Robert | B60N 2/777 |
| 2022/0194267 A1* | 6/2022 | Haller | B60N 2/797 |
| 2022/0194278 A1* | 6/2022 | An | E02F 9/2004 |
| 2022/0212582 A1* | 7/2022 | Schmid | B60N 2/767 |
| 2023/0191968 A1* | 6/2023 | Lee | B60N 2/77 297/411.3 |

* cited by examiner

APPARATUS FOR ADJUSTING POSITION OF ARMREST HAVING CONTROL PANEL FOR VEHICLE

CROSS REFERENCE TO RELATED APPLICATION

The present application claims under 35 U.S.C. § 119(a) the benefit of Korean Patent Application No. 10-2021-0161475, filed Nov. 22, 2021, the entire contents of which is incorporated herein for all purposes by this reference.

TECHNICAL FIELD

The present disclosure relates to an apparatus for adjusting a position of an armrest having a control panel for a vehicle and, more particularly, to an apparatus for adjusting a position of an armrest having a control panel for a vehicle, the apparatus being capable of easily adjusting an armrest having a control panel to an occupant-desired position.

DESCRIPTION OF THE RELATED ART

Usually, a console having an armrest is arranged between a driver seat and a seat adjacent to the driver seat. Thus, a driver or an occupant other than the driver can comfortably rest his/her arm on the armrest.

Alternatively, the armrest is directly mounted on a lateral portion of a seat back constituting a vehicle seat. Thus, a driver or an occupant other than the driver can rest his/her arm on the armrest.

However, the direct mounting of the armrest on the lateral portion of the seat back has the following problems.

First, in a case where a side airbag is mounted inside the seat back, inflation of the side bag during a collision may cause the phenomenon of interference with the armrest mounted on the seat back.

Second, the convenience of enabling the occupant to rest his/her hand on the armrest is decreased because it is impossible to adjust a height and length of the armrest mounted on the seat back. The arm lengths vary among occupants having different body types, and therefore, occupants' arms resting on the armrest vary in height and position.

Third, the armrest mounted on the seat back is positioned at a greater height than a buckle for fastening the seat belt. Thus, the armrest inconveniently causes interference when the seat belt is fastened and unfastened.

In addition, there is an increasing demand for a vehicle armrest on which the occupant can rest his/her arm rest and on which a control panel for controlling various devices for a vehicle can be installed to increase the occupant's convenience.

The foregoing is intended merely to aid in the understanding of the background of the present disclosure, and is not intended to mean that the present disclosure falls within the purview of the related art that is already known to those skilled in the art.

SUMMARY OF THE DISCLOSURE

An objective of the present disclosure is to provide an apparatus for adjusting a position of an armrest having a control panel for a vehicle, the apparatus in which an armrest assembly having a control panel is mounted on a side member of a seat cushion in a manner that is enabled to ascend and descend and in which the control panel is mounted on an armrest assembly in such a manner that a position in the backward-forward direction and a slope of the control panel are adjustable. With the apparatus, an armrest, a controller, and the like can be easily adjusted to desired positions and heights thereof according to an occupant's physical condition.

According to an aspect of the present disclosure, there is provided an apparatus for adjusting a position of an armrest having a control panel for a vehicle, the apparatus including: a stationary frame mounted on a side member of a seat cushion; an ascending and descending frame mounted on the stationary frame in a manner that is enabled to ascend and descend; an armrest frame mounted on a rear portion of the top of the ascending and descending frame; a trailer provided in such a manner as to have a structure where a control panel is installed on the top thereof, and mounted on a front portion of the top of the ascending and descending frame in such a manner that a position in the backward-forward direction of the trailer and a slope thereof are adjustable; and a drive device mounted on the stationary frame and the ascending and descending frame, driving the ascending and descending frame for ascending and descending, and at the same time adjusting the position in the backward-forward direction of the trailer and the slope thereof.

In the apparatus, stationary rails may be mounted on opposite lateral portions, respectively, of the stationary frame, and moving rails may be mounted on opposite lateral portions, respectively, of the ascending and descending frame, the moving rails being fastened to the station rails, respectively, in a manner that is enabled to ascend and descend.

In the apparatus, the drive device may include: a motor mounted on an external surface of the ascending and descending frame; first and second drive gears coaxially connected to an output shaft of the motor and positioned on an internal surface of the ascending and descending frame; a driven gear rotatably mounted on the ascending and descending frame and engaged with the first drive gear; a rack gear mounted on the stationary frame and engaged with the second drive gear; and a plurality of links positioned on the external surface of the ascending and descending frame, a lower end portion of the lowermost of the plurality of links being coaxially connected to the driven gear and an upper end portion of the uppermost thereof being connected to the trailer.

In some embodiments, the first drive gear and the second drive gear are coaxially connected to each other for being employed as pinion gears or helical-type gears.

In some embodiments, the driven gear is in the shape of a sector gear.

In some embodiments, the rack gear is engaged with the second drive gear.

In the apparatus, the first and second drive gears may be integrally connected in a coaxial manner to each other for being employed as a two-stage pinion gear.

In the apparatus, the plurality of links may include a drive link whose lower end portion is coaxially connected to a rotational shaft of the driven gear positioned on the internal surface of the ascending and descending frame; a push-pull link hinge-connected to a rear end portion of the trailer; and a connection link whose lower end portion is hinge-connected to the drive link and whose upper end portion is hinge-connected to the push-pull link.

In the apparatus, a first guide hole may be formed in the rear of an upper portion of the ascending and descending frame, and a first guide pin may be mounted on a hinge connection portion between the connection link and the push-pull link, the first guide pin being inserted into the first guide hole for being fastened thereto in a slidably movable manner.

In the apparatus, the first guide hole may include a first straight-line guide hole extending a long distance in the backward-forward direction; and a vertical guide hole extending downward from a front end portion of the first straight-line guide hole.

In the apparatus, a guide bracket may be mounted at a predetermined position on an external surface of an upper portion of the ascending and descending frame, the guide bracket serving to guide moving in the backward-forward direction of the trailer and adjusting of a slope thereof.

In the apparatus, in order to guide the moving in the backward-forward direction of the trailer and the adjusting of the slope thereof, second guide holes having the same track may be formed in a front part of the upper portion of the ascending and descending frame and the guide bracket, respectively, and second guide pins may be mounted on each of the opposite lateral portions of the trailer, the second guide pins being inserted into each of the second guide holes for being fastened thereto in a slidably movable manner.

In the apparatus, the second guide hole may include: a second straight-line guide hole extending a long distance in the backward-forward direction; and an inclination guide hole extending upward from a front end portion of the second straight-line guide hole.

In some embodiments, the inclination guide hole obliquely extends upward from a front end portion of the second straight-line guide hole.

The apparatus according to the present disclosure provides the following effects.

First, in the apparatus, an armrest assembly having a control panel is mounted on a side member of a seat cushion in a manner that is enabled to ascend and descend, and the control panel is mounted on an armrest assembly in such a manner that a position in the backward-forward direction and a slope of the control panel are adjustable. The apparatus can provide the convenience of easily adjusting an armrest, a controller, and the like to desired positions and heights according to an occupant's physical condition.

Second, when a seat is adjusted to a relaxation position according to an operation of reclining the seat back toward the rear of a vehicle and an operation of tiling a seat cushion, the control panel moves backward to the farthest position toward an occupant. At the same time, the armrest and the control panel descend to the smallest heights thereof. With this adjustment, the apparatus can provide the convenience of enabling the occupant to rest his/her arm on the armrest and the convenience of enabling operation of the control panel.

Third, the armrest and the control panel can be adjusted in such a manner as to have heights smaller than a height of a buckle for fastening a seat belt positioned on a lateral portion of the seat cushion. Thus, the armrest can be prevented from inconveniently causing interference when a seat belt is fastened and unfastened.

Fourth, instead of on the lateral portion of the seat back, the armrest and the control panel are mounted on a lateral portion of the seat cushion in a manner that is enabled to ascend and descend. Thus, when a side airbag mounted inside the seat back is inflated, a phenomenon of interference with the armrest can be prevented from occurring.

As discussed, the method and system suitably include use of a controller or processer.

In another embodiment, vehicles are provided that comprise an apparatus as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE EMBODIMENTS

Figure 1:
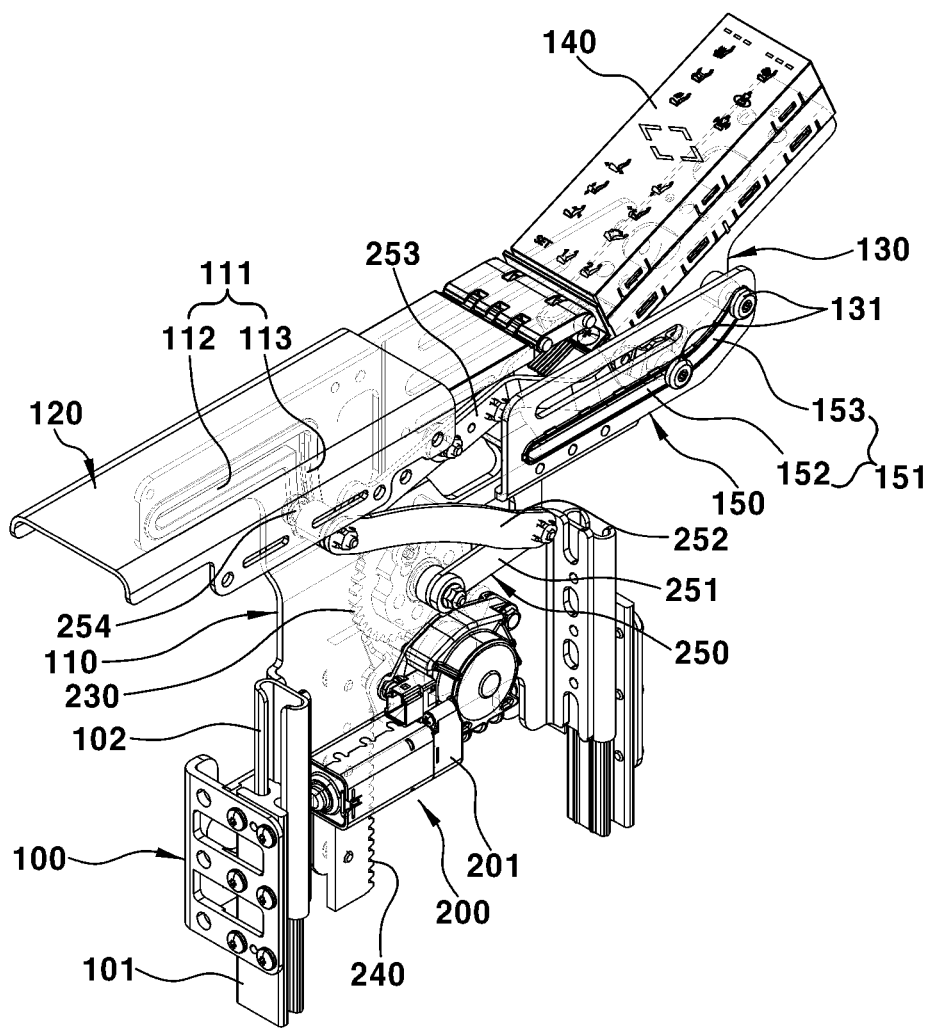
FIGS. 1 and 2 are perspective views each illustrating an apparatus for adjusting a position of an armrest having a control panel for a vehicle according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A desired embodiment of the present disclosure will be described below in detail with reference to the accompanying drawings.

Figure 2:
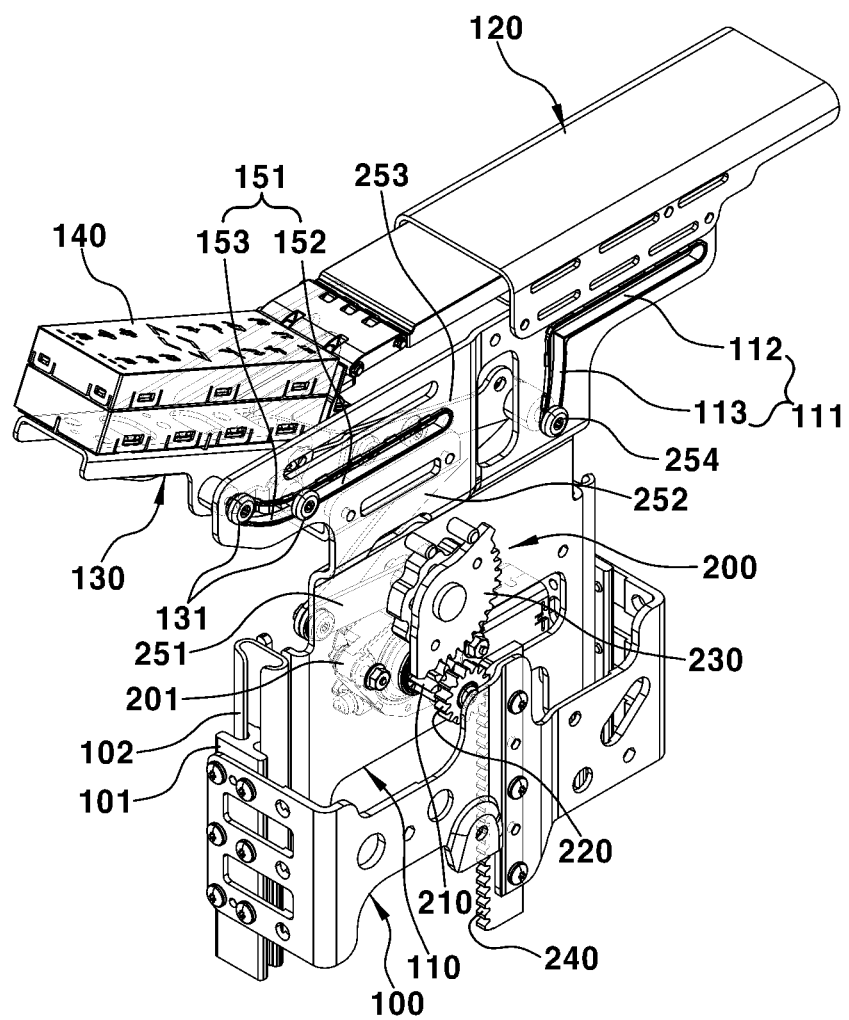
Figure 3:
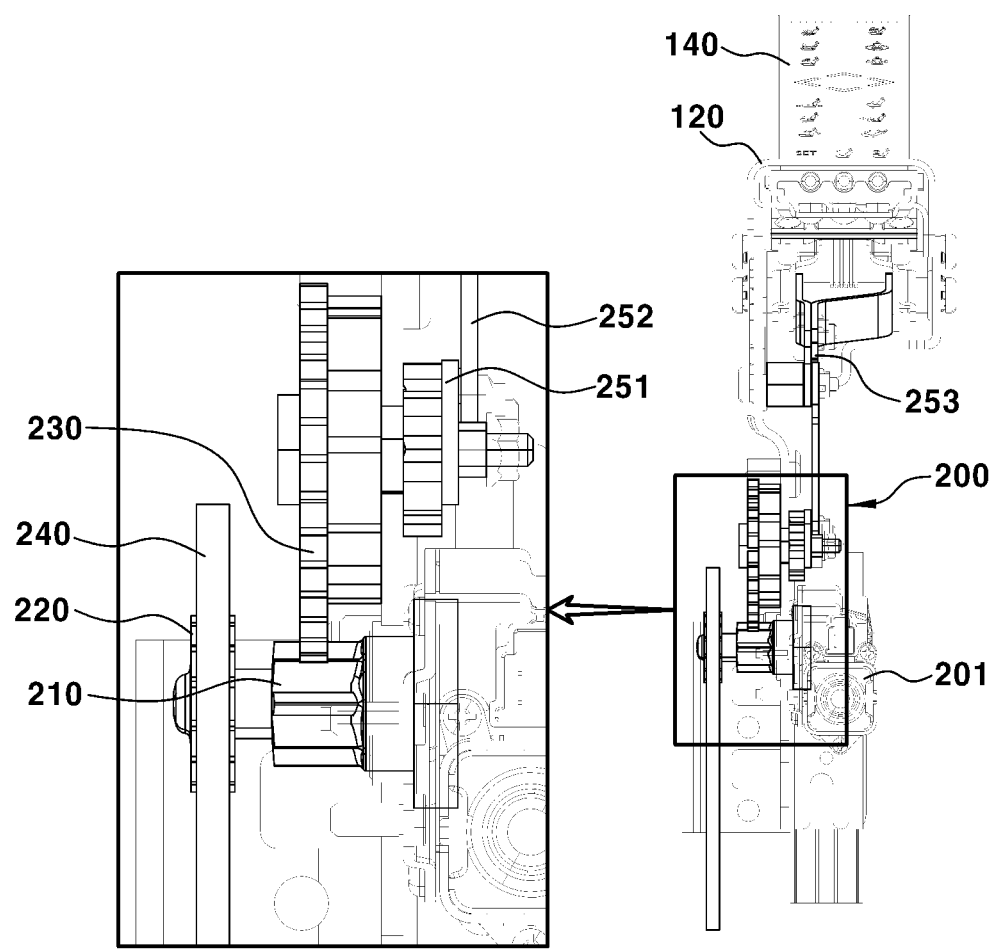
FIG. 3 is a vertical cross-sectional view illustrating the apparatus for adjusting a position of an armrest having a control panel for a vehicle according to the present disclosure.
Figure 4:
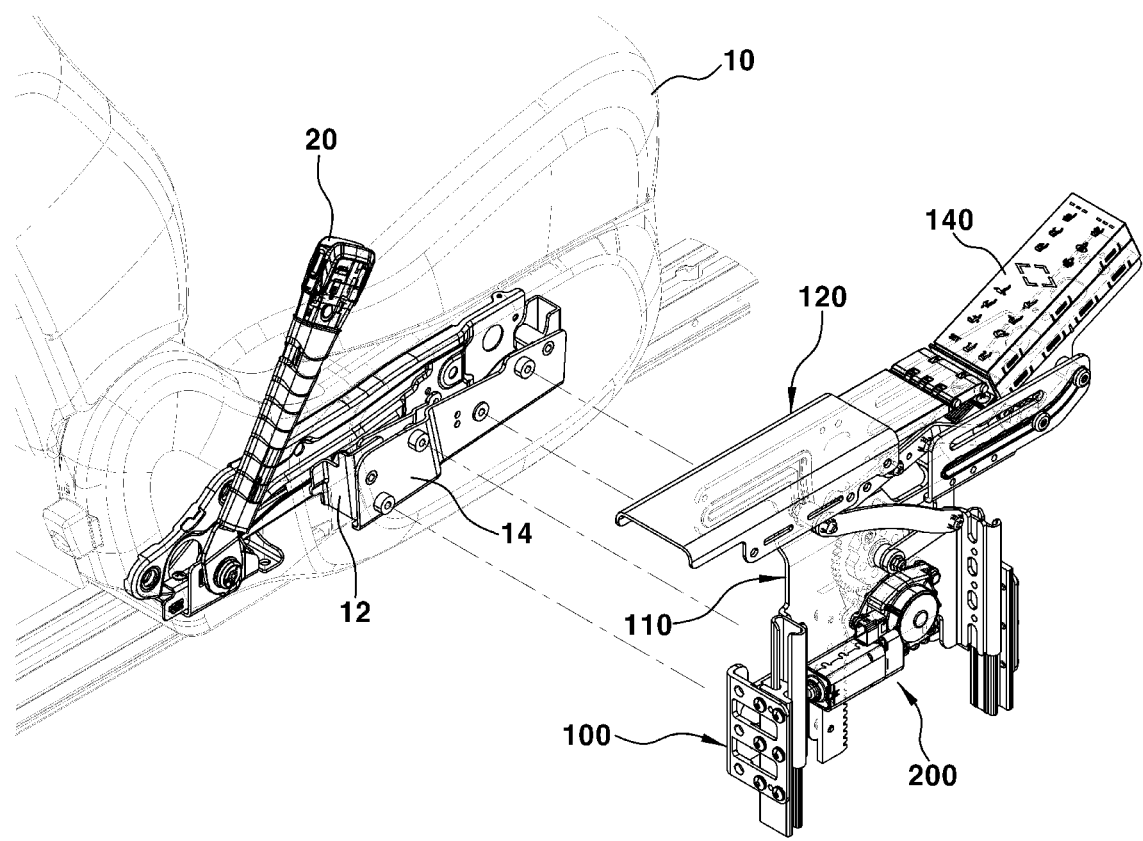
FIG. 4 is a perspective view illustrating a state where the apparatus for adjusting a position of an armrest having a control panel for a vehicle according to the present disclosure is mounted on a side member of a seat cushion.

FIGS. 1 to 3 are views each illustrating an apparatus for adjusting a position of an armrest having a control panel for a vehicle according to the present disclosure. FIG. 4 is a view illustrating a state where the apparatus for adjusting a position of an armrest having a control panel for a vehicle according to the present disclosure is mounted on a seat cushion frame. Reference number 100 in the drawings refers to a stationary frame.

A stationary frame 100 may be fixedly mounted on a lateral portion of a seat cushion 10.

To this end, as illustrated in FIG. 4, a side bracket 14 may be mounted on a side member 12 that constitutes a lateral frame of the seat cushion 10. For assembly, a stationary frame 100 is fixed to the side bracket 14 using a bolt or the like.

In addition, an ascending and descending frame 110 may be mounted on the stationary frame 100 in a manner that is enabled to ascend and descend.

To this end, stationary rails 101 may be mounted on opposite lateral portions, respectively, in the backward-forward direction of the stationary frame 100. Moving rails 102 are mounted on opposite lateral portions, respectively, of the ascending and descending frame 110. The moving rails 102 are fastened on the stationary rails 101, respectively, in a manner that is enabled to ascend and descend.

In this case, an armrest frame 120, serving as an enclosing armrest frame, may be mounted on a rear portion of the top of the ascending and descending frame 110. A trailer 130 is mounted on a front portion of the top of the ascending and descending frame 110 in a manner that is enabled to move backward and forward to adjust a position in the forward-backward direction of the trailer 130 and a slope thereof when the trailer 130 moves backward and forward. A control panel 140 is installed on the top of the trailer 130.

It is desirable that the control panel 140 to be installed on the top of the trailer 130 may be provided in such a manner as to have a structure where switches, buttons, and the like for operating various vehicle continence apparatuses (for example, a motor-operated seat, an air conditioner, and the like) are mounted in a predetermined arrangement.

According to the present disclosure, a drive device 200 may be mounted on the ascending and descending frame 110 mounted on the stationary frame 100. The drive device 200 serves not only to drive the ascending and descending frame 110 for ascending and descending, but also to move the trailer 130 backward and forward for adjusting a position in the backward-forward direction of the trailer 130 and adjusting a slope of the trailer 130 for arrangement.

As illustrated in FIGS. 1 to 3, the drive device 200 may be configured to include a motor 201, a first drive gear 210 and a second drive gear 220, a driven gear 230, and a rack gear 240. The motor 201 is mounted on an external surface of the ascending and descending frame 110. The first drive gear 210 and the second drive gear 220 are coaxially connected to an output shaft of the motor 201 and are positioned on an internal surface of the ascending and descending frame 110. The driven gear 230 is rotatably mounted on the ascending and descending frame 110. The driven gear 230 in the shape of a sector gear is engaged with the first drive gear 210. The rack gear 240 is mounted on an internal surface of the stationary frame 100 in a manner that is arranged in the upward-downward direction, and is engaged with the second drive gear 220.

At this point, the first drive gear 210 engaged with the driven gear 230 and the second drive gear 220 engaged with the rack gear 240, as illustrated in FIG. 3, may be integrally connected in a coaxial manner to each other for being employed as a two-stage pinion gear.

Alternatively, the first drive gear 210 and the second drive gear 220 may be employed as helical-type gears, in addition to the two-stage pinion gear.

In addition, the drive device 200 may be configured to further include a plurality of links 250. A lower end portion of the lowermost of the plurality of links 250 is coaxially connected to the driven gear 230, and an upper end portion of the uppermost thereof is connected to a rear end portion of the trailer 130. Thus, the plurality of links 250 are positioned on the external surface of the ascending and descending frame 110.

The plurality of links 250, as illustrated in FIGS. 1 and 2, may be configured to include a drive link 251, a push-pull link 253, and a connection link 252. A lower end portion of the drive link 251 is coaxially connected to a rotational shaft of the driven gear 230 positioned on the internal surface of the ascending and descending frame 110. The push-pull link 253 is hinge-connected to a lower end portion of the trailer 130. A lower end portion of the connection link 252 is hinge-connected to an upper end portion of the drive link 251, and an upper end portion thereof is hinge-connected to a rear end portion of the push-pull link 253.

In addition, among the plurality of links 250, the drive link 251, the connection link 252, and the like may be replaced with various power transmission mechanisms, such as pulleys and belts, for transmitting a rotational force.

A first guide hole 111 for guiding of moving in the backward-forward direction of the push-pull link 253 may be formed in the rear of an upper portion of the ascending and descending frame 110. A first guide pin 254 is mounted on a hinge connection unit between an upper end portion of the connection link 252 and the rear end portion of the push-pull link 253. The first guide pin 254 is inserted into the first guide hole 111 for being fastened thereto in a slidably movable manner.

It is desirable that the first guide hole 111 is configured to include a first straight-line guide hole 112 extending a long distance in the backward-forward direction and a vertical guide hole 113 extending downward from a front end portion of the first straight-line guide hole 112.

Accordingly, when the first guide pin 254 mounted on the hinge connection unit between the upper end portion of the connection link 252 and the rear end portion of the push-pull link 253 moves along the first straight-line guide hole 112 of the first guide hole 111, the trailer 130 connected to the push-pull link 253 and the control panel 140 installed on the top of the trailer 130 may also move backward and forward. Thus, the position in the backward-forward direction of the control panel 140 is adjusted.

In addition, the first guide pin 254 mounted on the hinge connection unit between the upper end portion of the connection link 252 and the rear end portion of the push-pull link 253 may be positioned on the front end portion of the first straight-line guide hole 112 of the first guide hole 111. Then, when the ascending and descending frame 110 ascends, the first guide pin 254 moves from the first straight-line guide hole 112 of the first guide hole 111 to the vertical guide hole 113 for changing a position thereof. Thus, the ascending and descending frame 110 can easily ascend to the highest position thereof.

A guide bracket 150 may be mounted at a predetermined position on an external surface of the upper portion of the ascending and descending frame 110. The guide bracket 150 serves to guide adjusting of a position in the backward-forward direction of the trailer 130 connected to the push-pull link 253 and adjusting of a slope of the trailer 130, and serves to guide adjusting of a position in the backward-forward direction of the control panel 140 installed on the top of the trailer 130 and adjusting of a slope of the control panel 140.

When the trailer 130 and the control panel 140 installed on the top of the trailer 130 move in the backward-forward direction, it is necessary to guide the moving in the backward-forward direction of the trailer 130 and the adjusting of the slope thereof. To this end, second guide holes 151 that have the same track are formed in a front part of the upper portion of the ascending and descending frame 110 and the guide bracket 150, respectively. Furthermore, second guide pins 131 are mounted on each of the opposite lateral portions of the trailer 130. The second guide pins 131 are inserted into each of the second guide hole 151 for being fastened thereto in a slidably movable manner.

It is desirable that the second guide hole 151 is configured to include a second straight-line guide hole 152 and an inclination guide hole 153. The second straight-line guide hole 152 extends a long distance in the backward-forward direction. The inclination guide hole 153 obliquely extends upward from a front end portion of the second straight-line guide hole 152.

Accordingly, when the push-pull link 253 moves backward, the second guide pin 131 of the trailer 130 may also move backward and then be positioned in the second straight-line guide hole 152 of the second guide hole 151. Thus, the trailer 130 and the control panel 140 installed on the top of the trailer 130 may also move backward and may be arranged in the horizontal state.

When the push-pull link 253 moves forward, the second guide pin 131 of the trailer 130 may also move forward and then be positioned in the inclination guide hole 153 of the second guide hole 151. Thus, the trailer 130 and the control panel 140 installed on the top of the trailer 130 may also move forward and at the same time may be arranged in such a manner as to have a slope that is inclined upward toward the front.

An operating state of the apparatus for adjusting a position of an armrest having a control panel according to the present disclosure will be described as follows.

Figure 5:
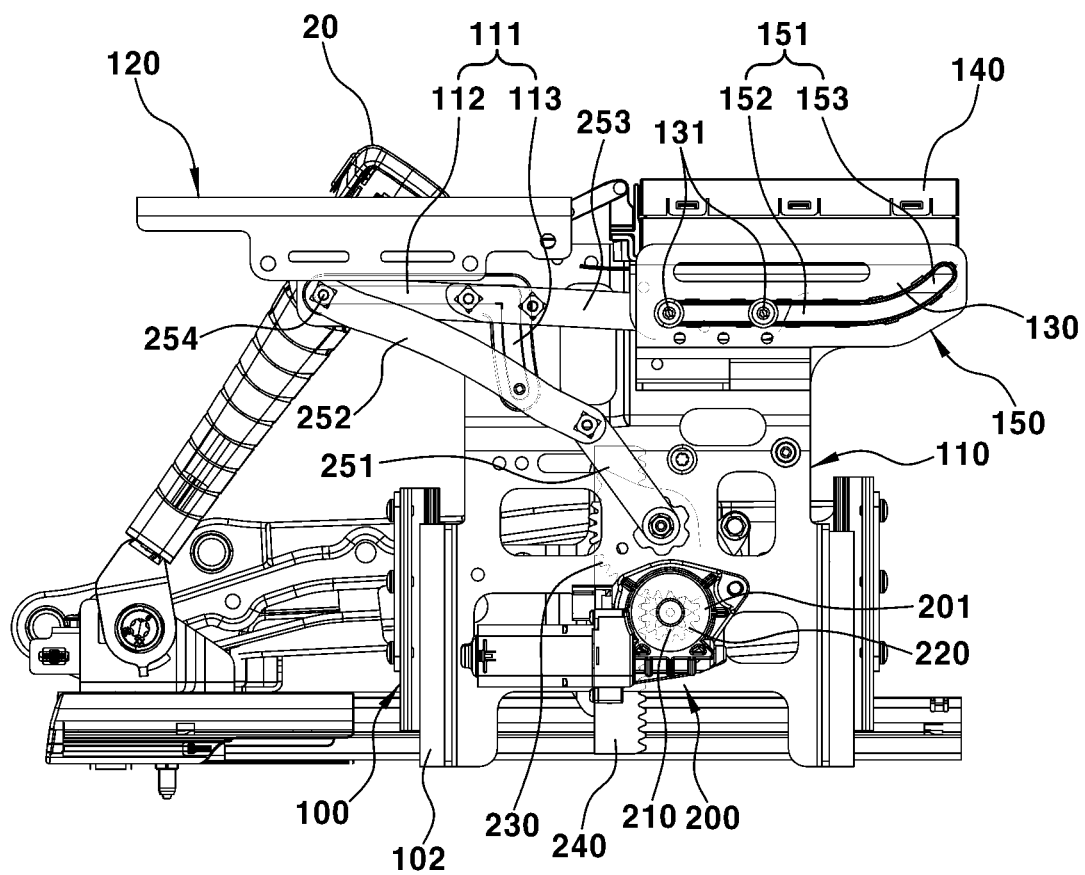
FIG. 5 is a front view illustrating a state where, by driving the apparatus for adjusting a position of an armrest having a control panel according to the present disclosure, an armrest descends to the lowest position thereof, and, at the same time, a control panel moves backward to the farthest position thereof.

FIG. 5 is a front view illustrating a state where, by driving the apparatus for adjusting a position of an armrest having a control panel according to the present disclosure, an armrest descends to the lowest position thereof, and, at the same time, the control panel moves backward to the farthest position thereof.

First, a user operates a switch provided on the control panel 140 or the like to drive the motor 201 for rotation in one direction. Then, the first drive gear 210 and the second drive gear 220, which are coaxially connected to the output shaft of the motor 201, may also rotate in one direction.

Subsequently, the driven gear 230 engaged with the first drive gear 210 may rotate counterclockwise, and at the same time, the drive link 251 connected to the rotational shaft of the driven gear 230 may rotate counterclockwise. Thus, the connection link 252 is pushed in the backward direction, and the push-pull link 253 connected to the connection link 252 is pulled in the backward direction.

Accordingly, the first guide pin 254 mounted on the hinge connection unit between the upper end portion of the connection link 252 and the rear end portion of the push-pull link 253, as illustrated in FIG. 5, may move backward to the rearmost portion of the first straight-line guide hole 112 of the first guide hole 111 and be positioned at the rearmost portion thereof. Thus, the push-pull link 253 moves backward to the farthest position thereof and is in a state of being positioned at the farthest position thereof.

At the same time, when the push-pull link 253 moves backward, as illustrated in FIG. 5, the second guide pin 131 of the trailer 130 may also move backward and be positioned in the second straight-line guide hole 152 of the second guide hole 151. Thus, the trailer 130 and the control panel 140 installed on the top of the trailer 130 also move backward to the farthest positions thereof and are arranged in the horizontal state.

In addition, when the motor 201 is driven for rotation in a first direction, the second drive gear 220 may also rotate in the first direction. Then, the rack gear 240 engaged with the second drive gear 220 moves downward in a straight line. Thus, the ascending and descending frame 110 on which the rack gear 240 is mounted may descend up to the lowest position thereof.

At this point, when the ascending and descending frame 110 descends, the moving rails 102 mounted on the opposite lateral portions, respectively, of the ascending and descending frame 110 may move along the stationary rails 101 mounted on the opposite lateral portions, respectively, in the backward-forward direction of the stationary frame 100. Thus, the ascending and descending frame 110 may stably descend along a predetermined track.

That is, when the ascending and descending frame 110 descends to the lowest position thereof, the armrest frame 120 and the trailer 130 on the top of which the control panel 140 is installed may be also arranged horizontally at the lowest descending position thereof and be in a state of being parallelly arranged along the backward-forward direction.

In this manner, for position adjustment, the control panel 140 may be caused to move backward to the farthest position thereof toward an occupant. At the same time, for height adjustment, the armrest 120 and the control panel 140 are caused to descend to the smallest heights thereof. Thus, with an operation of reclining a seat back toward the rear of a vehicle and an operation of tiling a seat cushion, a seat is adjusted in such a manner as to be positioned at a relaxation position. With this adjustment, the convenience of enabling the occupant to rest his/her arm on the armrest and the convenience of enabling operation of the control panel can be provided.

Moreover, when the armrest frame 120 and the control panel 140 move downward to the lowest positions thereof, the armrest frame 120 and the control panel 140 may be adjusted to heights lower than a height of a seatbelt fastening buckle 20 positioned on the lateral portion of the seat cushion 10. Thus, the armrest surrounded by the armrest frame 120 and the control panel 140 can be prevented from inconveniently causing interference when the user fastens and unfastens a seat belt.

Figure 6:
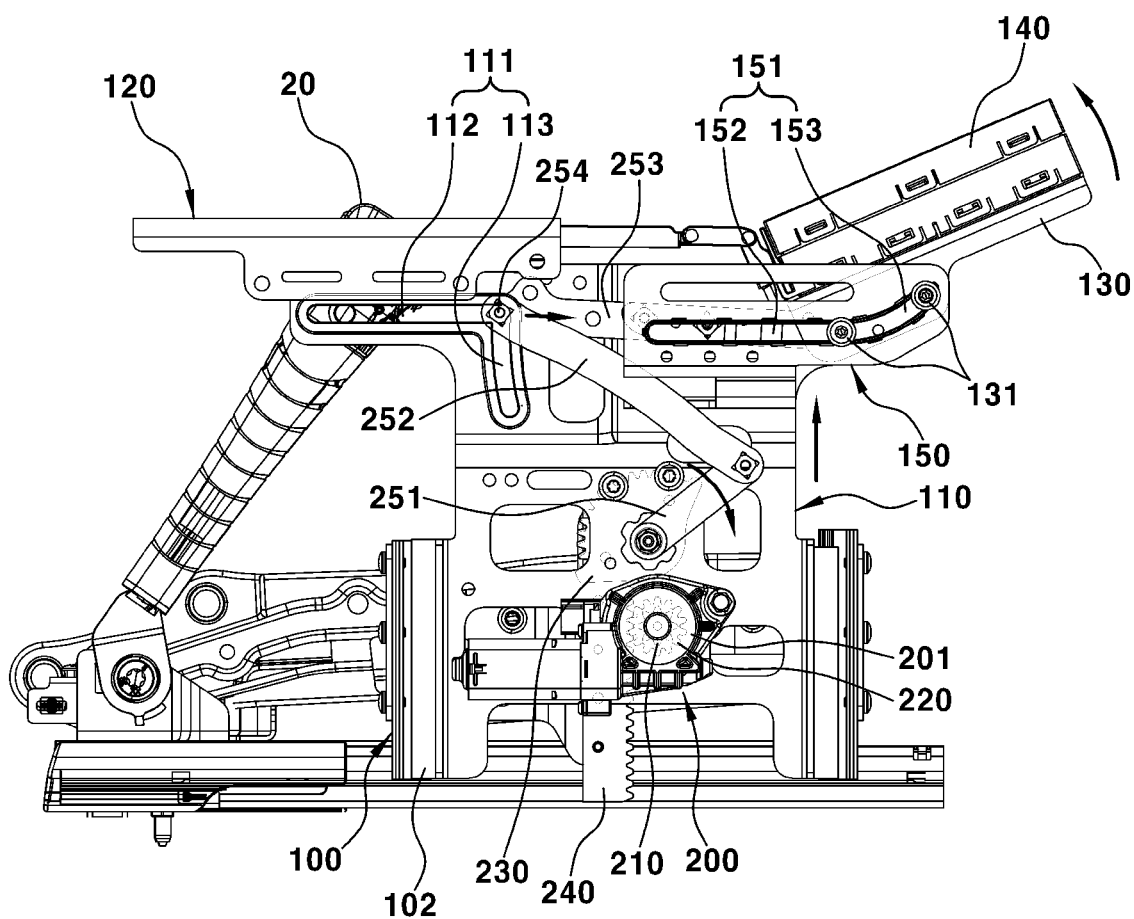
FIG. 6 is a front view illustrating a state where an operation of causing the armrest to ascend and descend and an operation of moving forward and tilting the control panel are performed at the same time by operating the apparatus for adjusting a position of an armrest having a control panel according to the present disclosure.

FIG. 6 is a front view illustrating a state where an operation of causing the armrest to ascend and descend and an operation of moving forward and tilting the control panel are performed at the same time by operating the apparatus for adjusting a position of an armrest having a control panel according to the present disclosure.

When the user operates a switch on the control panel 140 or the like to drive the motor 201 for rotation in a second direction, the first drive gear 210 and the second drive gear 220, which are coaxially connected to the output shaft of the motor 201, may also rotate in the second direction.

Subsequently, the driven gear 230 engaged with the first drive gear 210 may rotate clockwise, and at the same time, the drive link 251 connected to the rotational shaft of the driven gear 230 may rotate clockwise. Thus, the connection link 252 is pulled in the forward direction, and the push-pull link 253 connected to the connection link 252 is also pulled in the forward direction.

Accordingly, the first guide pin 254 mounted on the hinge connection unit between the upper end portion of the connection link 252 and the rear end portion of the push-pull link 253, as illustrated in FIG. 6, may move forward to the frontmost portion of the first straight-line guide hole 112 of the first guide hole 111 and be positioned at the front most portion thereof. Thus, the push-pull link 253 moves forward to the farthest position thereof and is in a state of being positioned at the farthest position thereof.

At the same time, when the push-pull link 253 moves forward, as illustrated in FIG. 6, the second guide pin 131 of the trailer 130 may also move forward from the second straight-line guide hole 152 of the second guide hole 151 to the inclination guide hole 153. Thus, the trailer 130 and the control panel 140 installed on the top of the trailer 130 move forward to the farthest positions thereof and, at the same time, are arranged in a manner that is inclined downward toward the occupant.

In addition, when the motor 201 is driven for rotation in a second direction, the second drive gear 220 may also rotate in the second direction. Then, the rack gear 240 engaged with the second drive gear 220 moves upward in a straight line. Thus, the ascending and descending frame 110 on which the rack gear 240 is mounted may ascend.

At this point, when the ascending and descending frame 110 ascends, the moving rails 102 mounted on the opposite lateral portions, respectively, of the ascending and descending frame 110 may move along the stationary rails 101 mounted on the opposite lateral portions, respectively, in the backward-forward direction of the stationary frame 100. Thus, the ascending and descending frame 110 may stably ascend along a predetermined track.

In this manner, in order for the occupant to operate the control panel 140 in a comfortable posture, the control panel 140 may be arranged in a manner that is inclined downward toward the occupant. At the same time, the ascending and descending frame 110 may ascend to an appropriate height, and then the armrest frame 120 may be adjusted to a height at which the occupant comfortably rests his/her arm on the armrest.

Of course, according to an amount of rotation of the motor 201, an adjustment is made so that a distance by which the push-pull link 253 moves forward and a distance by which the trailer 130 and the control panel 140 installed on the top of the trailer 130 move forward is shorter than a maximum forward movement distance.

Accordingly, according to the occupant's physical conditions (for example, an arm length, and the like), the armrest, the control panel, and the like may be easily adjusted to desired positions and heights thereof. Thus, the occupant convenience can be improved.

Figure 7:
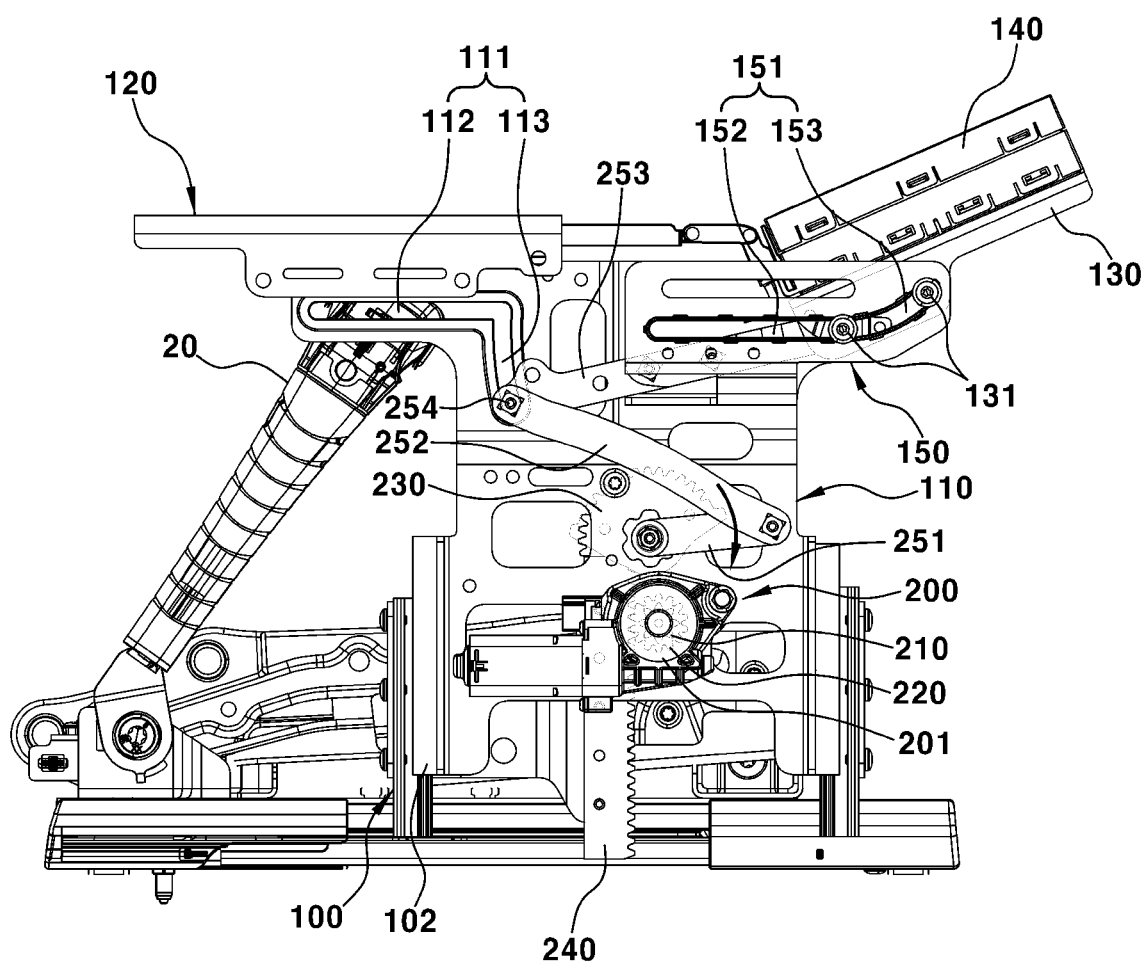
FIG. 7 is a front view illustrating that the armrest ascends to the highest position thereof in a state where the operation of moving forward and tilting the control panel is performed by operating the apparatus for adjusting a position of an armrest having a control panel according to the present disclosure.

FIG. 7 is a front view illustrating that the armrest ascends to the highest position thereof in a state where the operation of moving forward and tilting the control panel is performed by operating the apparatus for adjusting a position of an armrest having a control panel according to the present disclosure.

When the user operates a switch provided on the control panel 140 or the like to drive the motor 201 for further rotation in the second direction, the first drive gear 210 and the second drive gear 220 that are coaxially connected to the output shaft of the motor 201 may also further rotate in the second direction.

Subsequently, the driven gear 230 engaged with the first drive gear 210 may further rotate clockwise, and at the same time, the drive link 251 connected to the rotational shaft of the driven gear 230 further rotates clockwise. Thus, the connection link 252 may be pulled in the downward direction, and the push-pull link 253 connected to the connection link 252 be also pulled in the downward direction.

Accordingly, the first guide pin 254 mounted on the hinge connection unit between the upper end portion of the connection link 252 and the rear end portion of the push-pull link 253, as illustrated in FIG. 7, may descend from the frontmost portion of the first straight-line guide hole 112 of the first guide hole 111 to the vertical guide hole 113.

At this point, the second guide pin 131 of the trailer 130 may remain positioned in the inclination guide hole 153. Thus, the trailer 130 and the control panel 140 installed on the top of the trailer 130 are kept arranged in a manner that is inclined downward toward the occupant.

In addition, when the motor 201 is further driven for rotation in the second direction, the second drive gear 220 may further rotate in the second direction. Then, the rack gear 240 engaged with the second drive gear 220 further moves upward in a straight line. Thus, the ascending and descending frame 110 on which the rack gear 240 is mounted may ascend to the highest position thereof.

At this point, when the ascending and descending frame 110 ascends to the highest position thereof, the first guide pin 254 mounted on the hinge connection unit between the upper end portion of the connection link 252 and the rear end portion of the push-pull link 253, as illustrated in FIG. 7, may descend from the frontmost portion of the first straight-line guide hole 112 of the first guide hole 111 to the lowermost portion of the vertical guide hole 113.

In this manner, in order for the occupant to operate the control panel 140 in the comfortable posture, the control panel 140 may be arranged in a manner that is inclined downward toward the occupant. At the same time, the ascending and descending frame 110 may be adjusted in such a manner as to ascend to the maximum height thereof. Thus, the armrest, the control panel, and the like may be easily adjusted to the maximum heights thereof according to the occupant's physical conditions.

The embodiment of the present disclosure is described above in detail, but does not impose any limitation on the claimed scope of the present disclosure. Various modifications and improvements that a person of ordinary skill in the art makes using the fundamental concept of the present disclosure that is defined in the following claims will also be included in the claimed scope of the present disclosure.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An apparatus for adjusting a position of an armrest having a control panel for a vehicle, the apparatus comprising:
    a stationary frame mounted on a side member of a seat cushion;
    an ascending and descending frame mounted on the stationary frame in a manner that is enabled to ascend and descend;
    an armrest frame mounted on a rear portion of the top of the ascending and descending frame;
    a trailer having a structure where a control panel is installed on the top thereof, and mounted on a front portion of the top of the ascending and descending frame in such a manner that a position in the backward-forward direction of the trailer and a slope thereof are adjustable; and
    a drive device mounted on the stationary frame and operatively connected to the ascending and descending frame, driving the ascending and descending frame for ascending and descending, and at the same time adjusting the position in the backward-forward direction of the trailer and the slope thereof.

2. The apparatus of claim 1, wherein stationary rails are mounted on opposite lateral portions, respectively, of the stationary frame, and moving rails are mounted on opposite lateral portions, respectively, of the ascending and descending frame, the moving rails being fastened to the stationary rails, respectively, in a manner that is enabled to ascend and descend.

3. The apparatus of claim 1, wherein the drive device comprises:
    a motor mounted on an external surface of the ascending and descending frame;
    first and second drive gears coaxially connected to an output shaft of the motor and positioned on an internal surface of the ascending and descending frame;
    a driven gear rotatably mounted on the ascending and descending frame and engaged with the first drive gear;
    a rack gear mounted on the stationary frame and engaged with the second drive gear; and
    a plurality of links positioned on the external surface of the ascending and descending frame, a lower end portion of the lowermost of the plurality of links being coaxially connected to the driven gear and an upper end portion of the uppermost thereof being connected to the trailer.

4. The apparatus of claim 3, wherein the first and second drive gears are integrally connected in a coaxial manner to each other for being employed as a two-stage pinion gear.

5. The apparatus of claim 3, wherein the plurality of links comprise:
    a drive link whose lower end portion is coaxially connected to a rotational shaft of the driven gear positioned on the internal surface of the ascending and descending frame;
    a push-pull link hinge-connected to a rear end portion of the trailer; and
    a connection link whose lower end portion is hinge-connected to the drive link and whose upper end portion is hinge-connected to the push-pull link.

6. The apparatus of claim 5, wherein a first guide hole is formed in the rear of an upper portion of the ascending and descending frame, and a first guide pin is mounted on a hinge connection portion between the connection link and the push-pull link, the first guide pin being inserted into the first guide hole for being fastened thereto in a slidably movable manner.

7. The apparatus of claim 6, wherein the first guide hole comprises:
    a first straight-line guide hole extending a long distance in the backward-forward direction; and
    a vertical guide hole extending downward from a front end portion of the first straight-line guide hole.

8. The apparatus of claim 6, wherein a guide bracket is mounted at a predetermined position on an external surface of an upper portion of the ascending and descending frame, the guide bracket serving to guide moving in the backward-forward direction of the trailer and adjusting of a slope thereof.

9. The apparatus of claim 8, wherein, in order to guide the moving in the backward-forward direction of the trailer and the adjusting of the slope thereof, second guide holes are formed in a front part of the upper portion of the ascending and descending frame and the guide bracket, respectively, and second guide pins are mounted on each of the opposite lateral portions of the trailer, the second guide pins being inserted into each of the second guide holes for being fastened thereto in a slidably movable manner.

10. The apparatus of claim 9, wherein the second guide holes each comprises:
    a second straight-line guide hole extending a long distance in the backward-forward direction; and
    an inclination guide hole extending upward from a front end portion of the second straight-line guide hole.

11. The apparatus of claim 10, wherein the inclination guide hole obliquely extends upward from a front end portion of the second straight-line guide hole.

12. The apparatus of claim 3, wherein the first drive gear and the second drive gear are coaxially connected to each other for being employed as pinion gears or helical-type gears.

13. The apparatus of claim 3, wherein the driven gear is in the shape of a sector gear.

14. A vehicle comprising the apparatus of claim 1.

* * * * *